United States Patent [19]
Kimura et al.

[11] Patent Number: 5,103,149
[45] Date of Patent: Apr. 7, 1992

[54] DIRECT TEACHING TYPE ROBOT

[75] Inventors: Yutaka Kimura; Hiroshi Okumura; Eiji Matumoto, all of Nagoya, Japan

[73] Assignee: Mitsubishi Jukogyo Kabushiki Kaisha, Tokyo, Japan

[21] Appl. No.: 656,429

[22] Filed: Feb. 19, 1991

[30] Foreign Application Priority Data

Feb. 16, 1990 [JP] Japan .................... 2-33863

[51] Int. Cl.$^5$ ............................................ G05B 19/42
[52] U.S. Cl. ............................ 318/568.1; 318/568.11; 318/573; 318/568.13; 901/3; 901/15; 901/20; 395/1
[58] Field of Search ................. 318/560–630; 388/800–830; 364/513; 901/3, 9, 8, 12, 15–23

[56] References Cited

U.S. PATENT DOCUMENTS

| | | | |
|---|---|---|---|
| 4,442,387 | 4/1984 | Lindbom | 318/568.13 |
| 4,737,697 | 4/1988 | Maruo et al. | 318/568.14 |
| 4,931,711 | 6/1990 | Naruo | 318/628 |

Primary Examiner—Paul Ip
Attorney, Agent, or Firm—Fleit, Jacobson, Cohn, Price, Holman & Stern

[57] ABSTRACT

A direct teaching type robot in which in the playback of the robot an electric power corresponding to a playback command is supplied to an electric motor from a servo driver so that the electric motor is driven to move a moving arm of the robot and in the teaching operation the moving arm is directly moved by an instructor to teach its movement to the robot includes breaking means provided in the servo driver for breaking a current generated by the electric motor when the electric motor is rotated in response to the teaching operation of the moving arm so as not to flow into the servo driver, whereby operation force by the instructor for moving the moving arm of the robot in the teaching can be reduced.

4 Claims, 4 Drawing Sheets

DIRECT TEACHING TYPE ROBOT

FIELD OF THE INVENTION AND RELATED ART STATEMENT

The present invention relates to a direct teaching type robot.

In the direct teaching system of a robot, an operator directly moves an end or/and a wrist of a moving arm of the robot to teach movement positions thereof to the robot. The direct teaching system is advantageous in that a teaching time is remarkably short and a complicated path can be taught to the robot efficiently. Accordingly, the direct teaching system is applied to many robots, specifically most of painting robots.

However, if large operation force for moving the end or/and the wrist of the moving arm of the robot is required, it is difficult to operate or move them, so that the advantage is not utilized effectively and the operator is affected with physical trouble such as a crick in the back. Heretofore, various methods of lightening the operation force in teaching of the robot have been proposed.

In order to solve the disadvantage, the present inventors develop a direct teaching type robot as shown in FIG. 4 and filed a patent thereof in Japanese Patent Office (Japanese Patent Application No. 81561/1989). The technique shown in FIG. 4 is now described. In FIG. 4, numeral 1 denotes a moving arm of a motor-driven painting robot which is moved by an operator in the direct teaching. The moving arm 1 is driven by an AC servomotor 3 through a reduction gear 2. The AC servomotor 3 includes a PLG (pulse generator) 4 for feedback control of position and speed. Power lines 5 and 6 for U and V phases of the AC servomotor 3 are connected through a contactor 8 to a servo driver 9 and a power line 7 for W phase thereof is connected to the servo driver 9 directly. The power lines 5, 6 and 7 are further connected to a power inverter 10 in the servo driver 9. Only an inversion system of the servo driver 9 necessary for description is illustrated.

The power inverter 10 includes six transistors 11, 12, 13, 14, 15 and 16, and the transistors 11 and 12, 13 and 14, and 15 and 16 are connected in series to each other, respectively. The power line 5 is connected to the transistors 15 and 16, the power line 6 is connected to the transistors 13 and 14, and the power line 7 is connected to the transistors 11 and 12. Collectors of the transistors 11, 13 and 15 and emitters of the transistors 12, 14 and 16 are connected to a rectifier 17 to which power lines 18, 19 and 20 of an AC commercial power source not shown are connected. Further, a filter condenser 21 and a snubber 22 are connected in parallel with the rectifier 17.

Protection diodes 23, 24, 25, 26, 27 and 28 are connected between the collectors and the emitters of the transistors 11, 12, 13, 14, 15 and 16, respectively. The transistors 11 and 12 are connected to a base drive circuit 29, the transistors 13 and 14 are connected to a base drive circuit 30, and the transistors 15 and 16 are connected to a base drive circuit 31.

The servo driver 9 is connected to a robot controller 32 and a mode switch 33 connected to the contactor 8 is connected to a robot control panel now shown.

With such a configuration, if there is no contactor 8 and the power lines 5, 6 and 7 remain connected to the servo driver 9 in direct teaching, the AC servomotor 3 is rotated in accordance with the teaching operation and an induced electromotive force is produced in the AC servomotor 3 so that electric power is supplied to the power inverter 10 through the power lines 5, 6 and 7 to produce brake torque. This is because the protection diodes 23, 24, 25, 26, 27 and 28 constitute a full-wave rectifier and a current is supplied to the filter condenser 21 from the AC servomotor 3 to charge the condenser 21.

Accordingly, in the direct teaching, if the mode switch 33 on the robot control panel is switched to the direct teaching mode and the contactor 8 is operated by a signal of the mode switch 33 to cut off power lines 5 and 6, the current for charging the filter condenser 21 is broken and the brake torque for the motor 3 is not produced. Thus, the moving arm 1 can be moved easily with small force.

Further, the PLG 4 included in the AC servomotor 3 remains connected to the servo driver 9 through a signal line 43. Since the AC servomoter 3 is coupled with the moving arm 1 through the reduction gear 2, the PLG 4 included in the AC servomotor 3 is rotated in response to movement of the moving arm 1 and a signal thereof is supplied to the servo driver 9 through the signal line 43. More particularly, a rotational number and a rotational position of the AC servomotor 3 are detected and supplied to the robot controller 32 so that operation of the moving arm 1 is taught.

However, the direct teaching type robot shown in FIG. 4 has a problem that the power lines 5 and 6 themselves of the AC servomotor 3 are opened or broken and accordingly the contactor 8 having a large capacity corresponding to a capacity of the servomotor must be used. Further, since the drive circuit of the contactor 8 is required to be provided within the controller, the circuit within the controller is complicated and is expensive.

OBJECT AND SUMMARY OF THE INVENTION

The present invention has been made in view of the above problem, and an object of the present invention is to provide a direct teaching type robot which solves the problem and can reduce operation force in teaching with a simple configuration.

In order to achieve the object, the direct teaching type robot according to the present invention in which in the playback of the robot an electric power corresponding to a playback command is supplied to an electric motor from a servo driver so that the electric motor is driven to move a moving arm of the robot and in the teaching operation the moving arm is directly moved by an instructor to teach its movement to the robot is characterized by the provision of breaking means provided in the servo driver for breaking a current generated by the electric motor when the electric motor is rotated in response to the teaching operation of the moving arm so as not to flow into the servo driver.

Operation of the present invention is now described.

In the direct teaching of the robot, when an operator moves the moving arm of the robot to teach its movement to the robot, the electric motor for driving the moving arm is also rotated in response to the movement of the moving arm.

Accordingly, an electromotive force is induced in a winding of the motor in response to the rotation of a rotor of the motor and the motor is operated as a generator. In this case, the power lines for the motor can be regarded as an output circuit. Since the power lines are usually connected to a servo driver of the motor, a current flows into the servo driver from the winding of the motor through the power lines. Thus, a brake torque is produced in the rotor and is a rotation resistance for the motor.

Thus, in this present invention, a breaking circuit is provided in the servo driver and a current generated by the electric motor in the teaching operation to flow into the servo driver is broken by the breaking circuit.

Consequently, brake torque is not produced in the motor by breaking the current generated in the motor.

As described above, the present invention possesses the following effects:

(1) Since the motor is not cut or separated from the moving arm in the direct teaching of the robot, it is not necessary to newly provide a position detector for detecting a position and a speed of the moving arm.

(2) When the motor is rotated artificially, the current generated by the motor as a generator is broken so that production of the brake torque for the motor is prevented. Accordingly, the moving arm of the robot can be moved lightly.

(3) Since the breaking circuit is merely provided in the servo driver, reduction of the operation force can be attained with inexpensive and simple configuration.

DETAILED DESCRIPTION OF PREFERRED EMBODIMENTS

Figure 4:
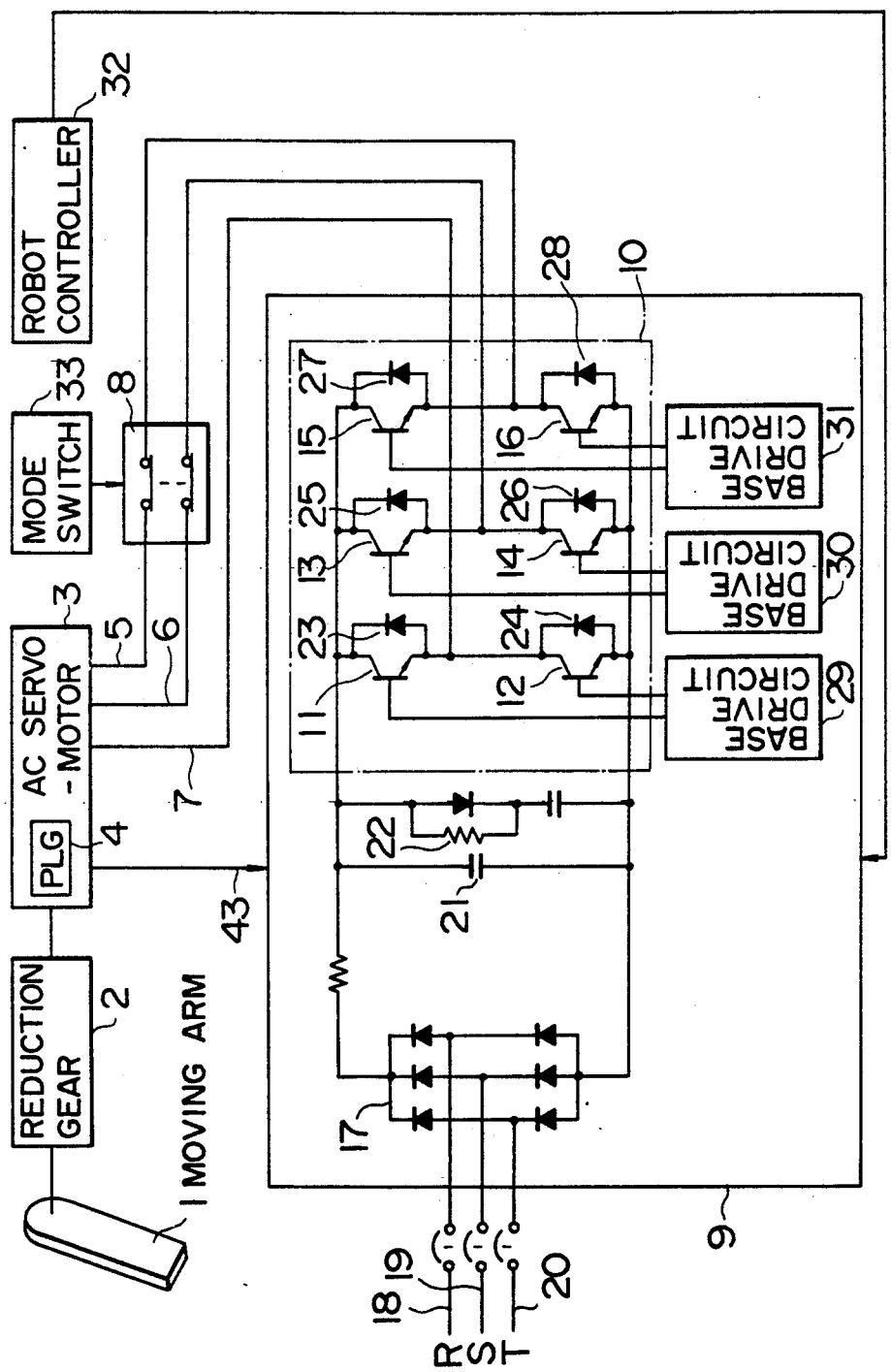
FIG. 4 is a circuit diagram showing a conventional direct teaching type robot.

Embodiments of the present invention are now described with reference to drawings. Constituent elements having the same function as that of those of FIG. 4 showing the conventional circuit are designated by the same numbers and description of overlapping portions is omitted.

Figure 1:
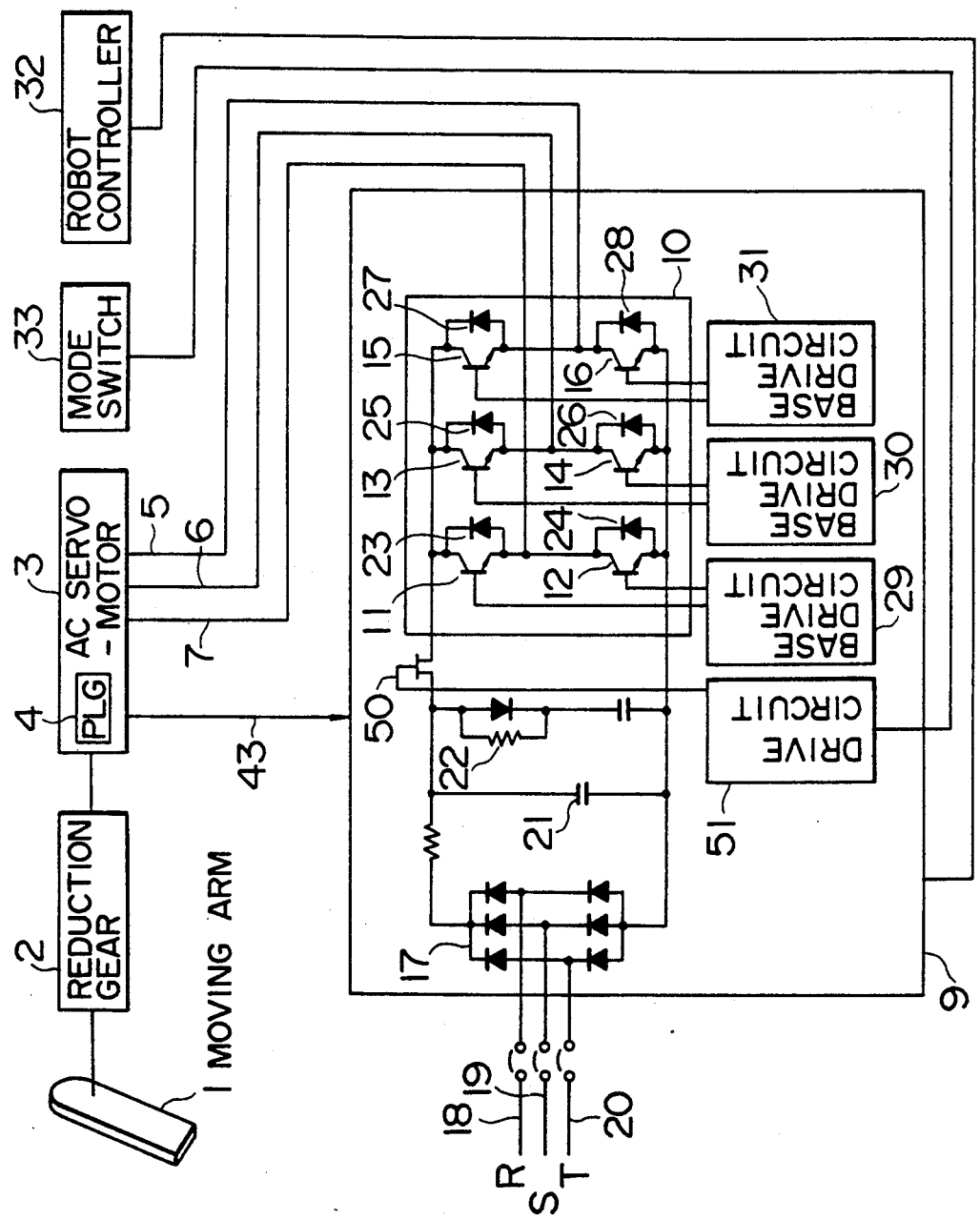
FIGS. 1 to 3 are circuit diagrams showing embodiments of the present invention, respectively.

FIG. 1 shows a first embodiment of the present invention. The embodiment includes a field effect transistor (FET) 50 and a drive circuit 51 in the servo driver 9. The FET 50 is connected in a line connecting between the filter condenser 21 and the snubber circuit 22 and the transistors 11, 13 and 15 of the power inverter 10, that is, in series to the DC power output circuit. On the other hand, the drive circuit 51 receives a switching signal from the mode switch 33 to cut off the FET 50 in the teaching and to turn on the FET 50 in the playback. Other configuration is the same as in FIG. 4.

In the embodimemts, the following operation is made in the playback of the robot. DC current produced from the rectifier 17 of the servo driver 9 is converted into AC current by the power inverter 10 operated in response to a command of the robot controller 32 and is supplied to the AC servomotor 3 through the power lines 5, 6 and 7 as an output signal of the servo driver 9. Accordingly, the AC servomotor 3 is rotated and its rotation is transmitted to the moving arm 1 through the reduction gear 2 to the moving arm 1. At this time, a pulse signal generated from the PLG 4 in response to the rotation of the AC servomotor 3 is supplied to the servo driver 9 and the servo driver 9 counts the pulse signal of the PLG 4 so that a rotational number and a rotational position of the AC servomotor 3 are detected. The rotational number and the rotational position of the AC servomotor 3 is supplied to the robot controller 32 and the robot controller 32 controls a moving speed and a position of a moving arm 1.

On the other hand, in teaching, when a teaching mode command is supplied to the drive circuit 51 by means of the mode switch 33, the drive circuit 51 turns off the FET 50. Accordingly, when the AC servomotor 3 is rotated in response to force of the moving arm 1 and operates as a generator, a current generated by the generator is broken by the FET 50 and the condenser 21 and a condenser in the snubber circuit 22 are not charged. Thus, the brake torque by the current generated by the AC servomotor 3 is not produced. Further, since the AC servomotor 3 is of non-contact structure having no brush and commutator, the AC servomotor 3 has no mechanical contact resistance.

Accordingly, the AC servomotor 3 is moved smoothly without a resistance. Thus, the moving arm 1 can be moved lightly and the teaching operation can be made easily.

Furthermore, in the teaching, the AC servomotor 3 remains coupled with the moving arm 1 and the PLG 4 can produce the pulse signal in response to the movement of the moving arm 1. Accordingly, even in the teaching, the robot controller 32 can grasp the position etc. of the moving arm 1 exactly and even after the teaching an actual position of moving arm 1 is not shifted from the position of the moving arm recognized by the robot controller 32.

Figure 2:
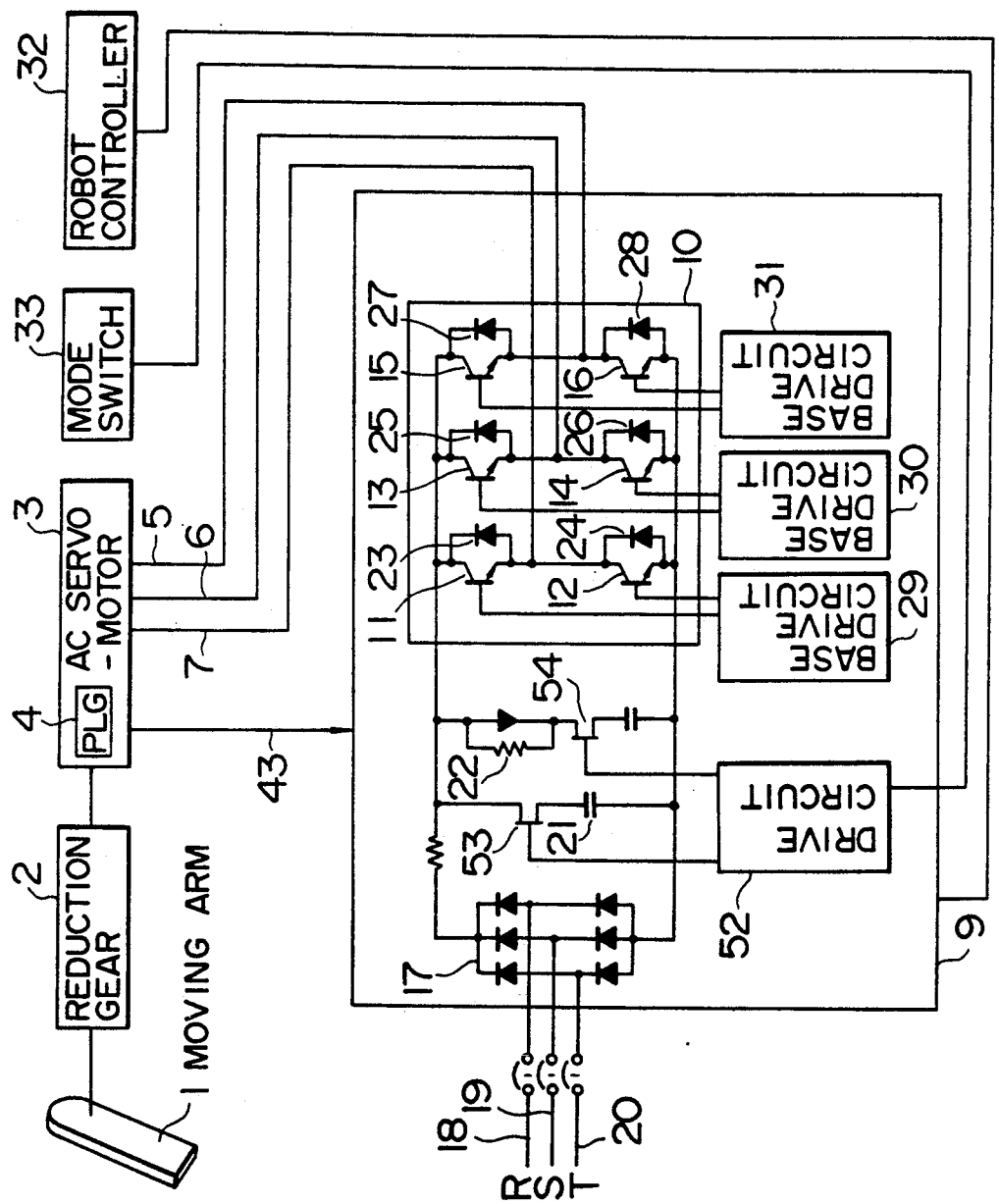

FIG. 2 shows a second embodiment of the present invention. In this embodiment, FET's 53 and 54 are connected in series to the filter condenser 21 and the condenser of the snubber circuit 22, respectively. Thus, the FET's 53 and 54 are turned off by the drive circuit 52 in the teaching are turned on in the operation of the robot.

Figure 3:
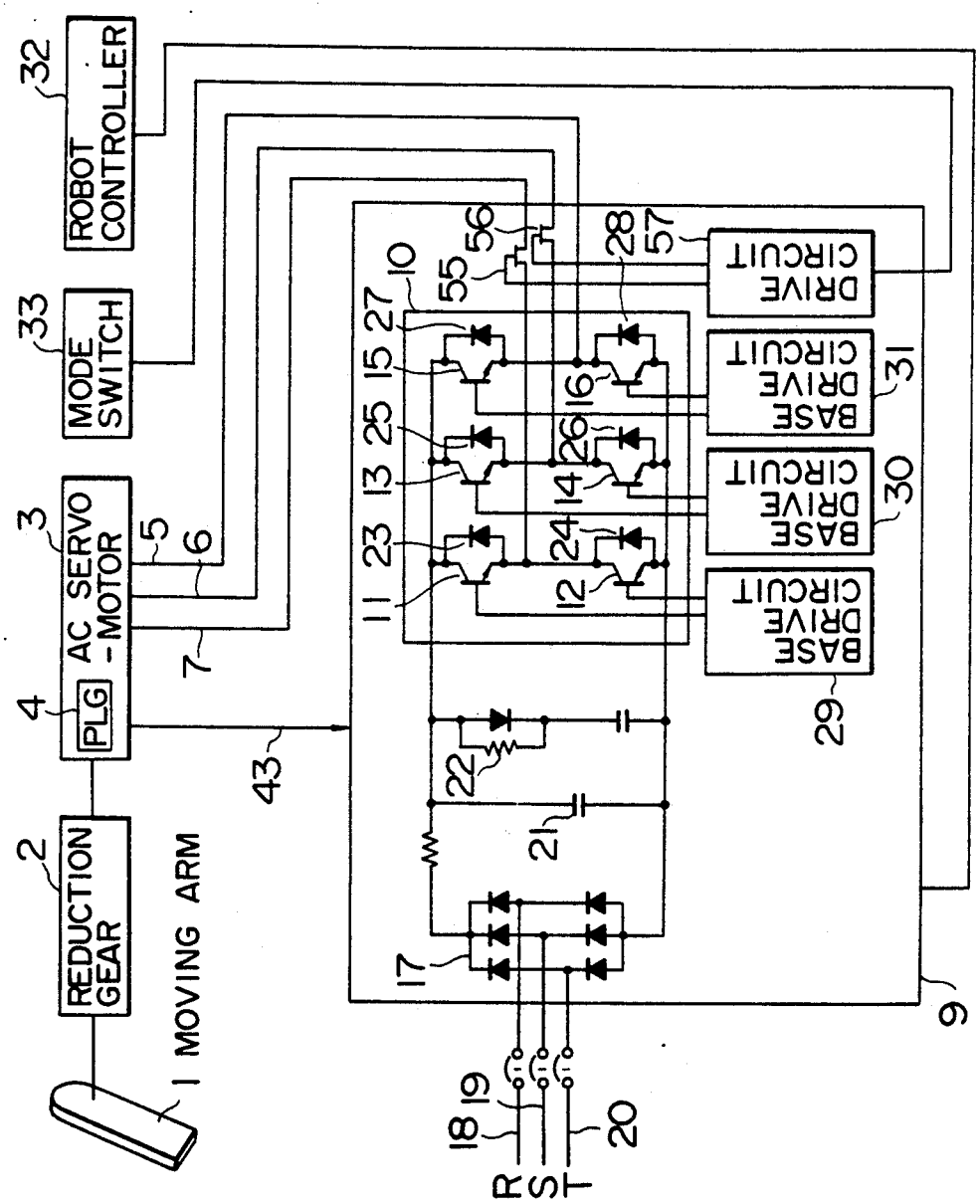

FIG. 3 shows a third embodiment of the present invention. In this embodiment, FET's 55 and 56 are connected in series to the power lines 6 and 7 of the servo driver 9, respectively. Thus, the FET's 55 and 56 are turned off by the drive circuit 57 in the teaching and are turned on in the operation of the robot.

In the embodiments, the AC servomotor is used as a servomotor for the moving arm of the robot, while a DC servomotor or other electric motor may be used. Further, it is not necessary that the position detector such as the PLG is included in the motor, and the position detector can be used as it is in the same manner as the embodiments since the position detector is rotated with the servomotor if the position detector is coupled with the servomotor by means of a coupling or the like.

We claim:

1. In a direct teaching type robot including an electric motor and a servo driver for driving a moving arm, wherein at the time of playback of the robot an electric power corresponding to a playback command is supplied to the electric motor from the servo driver, so as to drive said electric motor to move a moving arm of the robot, and while in a teaching mode, the arm of the robot is moved directly by an instructor's hand to teach movement to the robot, the improvment comprising:

a transistor connected in series in an electric circuit in said servo driver in which an electric current generated by said electric motor flows in while in the teaching mode;

a drive circuit for turning on or off said transistor; and a mode change-over switch for supplying a mode command to said driver circuit, wherein at the time of playback of the robot, said mode change-over switch is placed in a playback mode so as to turn on said transistor through said drive circuit and at the time of the teaching mode, said mode change-over switch is placed in a teaching mode so as to turn off said transistor through said drive circuit.

2. The improvement of claim 5, wherein said transistor is a field effect transistor (FET) connected in a series to a DC power output circuit in said servo driver.

3. The improvement of claim 5, wherein said transistor is a field effect transistor (FET) connected in series to a filter condenser circuit for a DC power source in said servo driver.

4. The improvement of claim 5, wherein said transistor is a field effect transistor (FET) connected in series to a power output circuit in said servo driver.

* * * * *